(12) United States Patent
Tomisaki et al.

(10) Patent No.: US 6,429,436 B1
(45) Date of Patent: Aug. 6, 2002

(54) RADIOGRAPHIC FLAT PANEL DETECTOR

(75) Inventors: Takayuki Tomisaki; Takuya Sakaguchi, both of Tochigi (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/400,429

(22) Filed: Sep. 21, 1999

(30) Foreign Application Priority Data

Sep. 22, 1998 (JP) .......................................... 10-268588

(51) Int. Cl.[7] ................................................. G01T 1/24
(52) U.S. Cl. ............................ 250/370.09; 250/370.11; 250/370.14
(58) Field of Search ....................... 250/370.09, 370.11, 250/370.14

(56) References Cited

U.S. PATENT DOCUMENTS 5,324,980 A * 6/1994 Kusunoki ..................... 257/74
5,355,013 A * 10/1994 Parker .................... 250/370.09
5,929,449 A * 7/1999 Huang .................... 250/370.09

* cited by examiner

*Primary Examiner*—Constantine Hannaher
*Assistant Examiner*—Andrew Israel
(74) *Attorney, Agent, or Firm*—Oblon, Spivak, McClelland, Maier & Neustadt, P.C.

(57) ABSTRACT

A glass substrate has formed on a front side thereof pixels each including a photoelectric conversion device, a capacitor and a TFT, and signal lines for reading signals via TFT's of the pixels, and on a back side thereof vertical selection lines for selecting the pixels, and has provided therethrough electric contacts for interconnection between gates of the TFT's and the vertical selection lines. The signal lines and the vertical selection lines are in a crossing relationship at thickness distance across the substrate, with reduced wiring capacities therebetween.

19 Claims, 12 Drawing Sheets

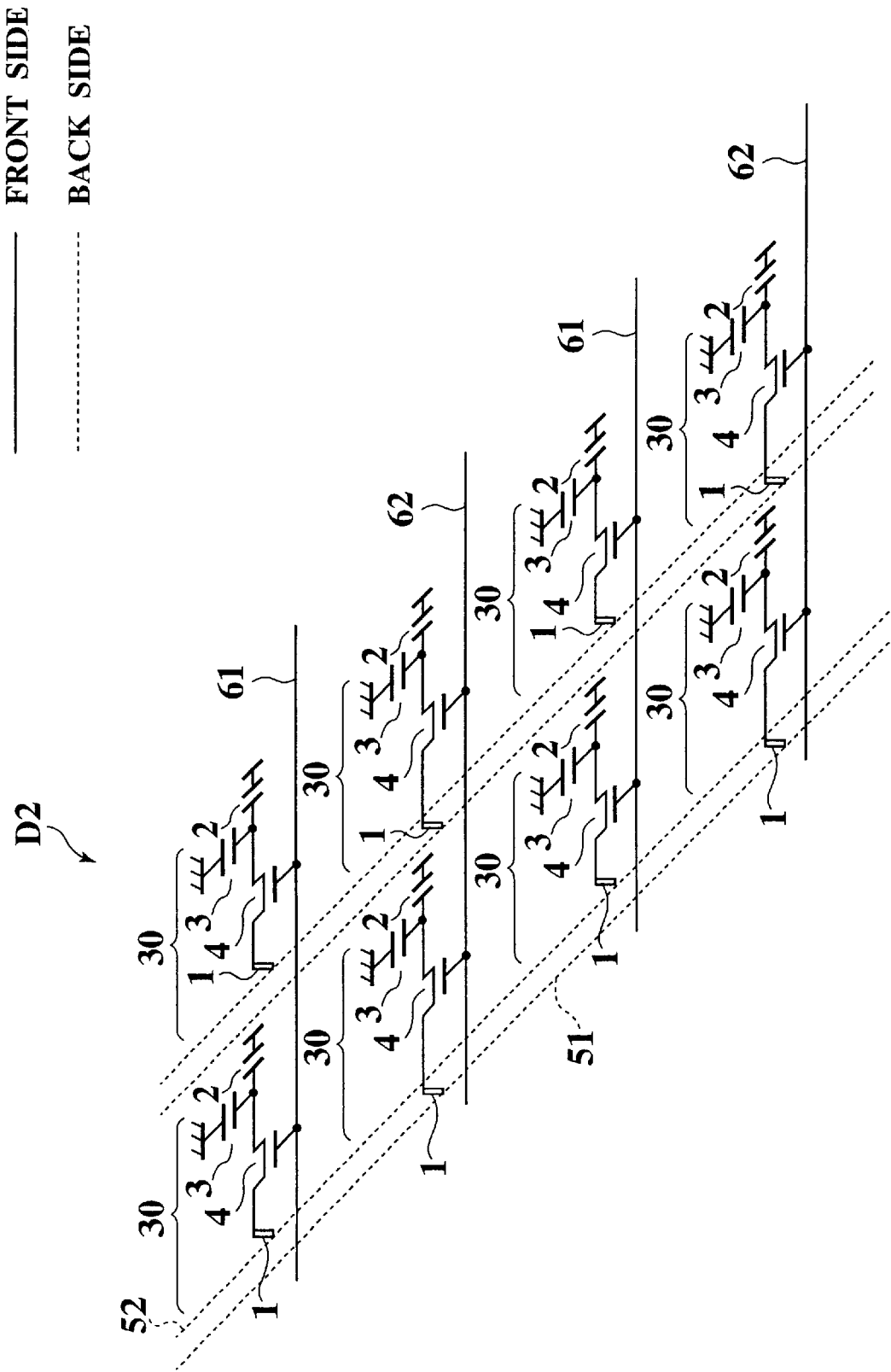

——————— FRONT SIDE
----------------------- BACK SIDE

——————— FRONT SIDE
------------- BACK SIDE

——————— FRONT SIDE
------------- BACK SIDE

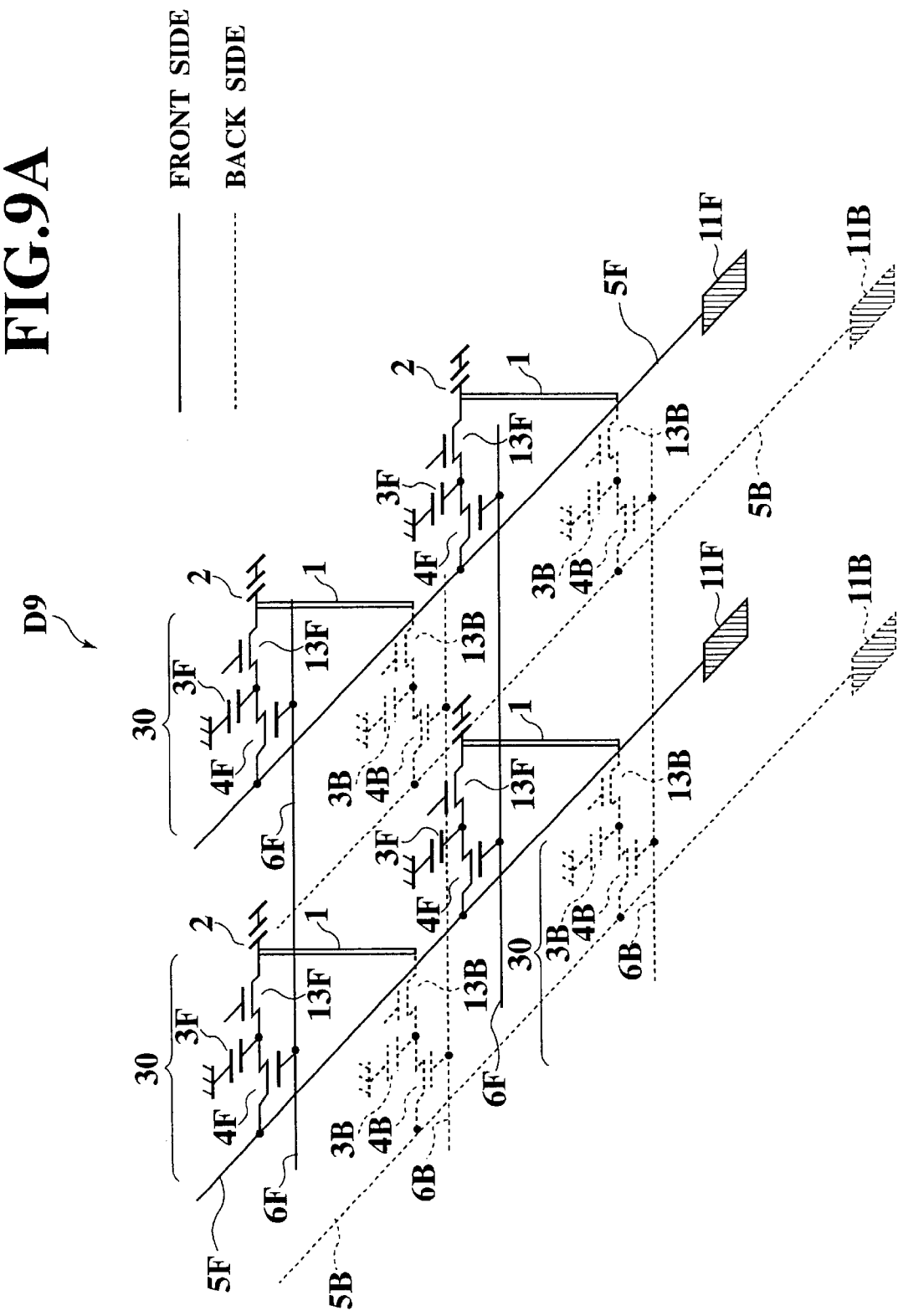

RADIOGRAPHIC FLAT PANEL DETECTOR

BACKGROUND OF THE INVENTION

1. Field of the Invention

The present invention relates to a flat panel detector made up by use of thin film techniques and adapted for reception of radiation rays.

2. Description of the Related Art

Such a flat panel detector is constituted with circuits including the film transistors (hereafter called "TFT") and other devices, the circuits being laminated by repeating such processes that a thin film is formed, e.g. on one side of a glass substrate, and patterned by an etching, then another thin film is formed thereon and additionally patterned.

FIG. 11 shows a conventional flat panel detector.

This flat panel detector has a constitution in which a plurality of pixels 30) are arrayed like a lattice on a plane, and is provided with signal lines 5 for reading signals of the pixels 30 outside, and vertical selection lines 6 for selecting pixels arrayed in crossing direction to the signal lines 5. Each pixel 30 includes a photoelectric conversion device 2 for generating a quantity of electric charges depending on an amount of incident light or a dose of incident X-rays, a capacitor 3 for accumulating generated charges, and a signal read-out TFT 4 for reading accumulated charges as a signal.

The photoelectric conversion device 2 may be a selenium device adapted for direct conversion from X-ray to electric charge, which may be substituted with the combination of a sensitized sheet and a photo diode.

With an on-voltage applied to an arbitrary vertical selection line 6, TFT 4 becomes conductive at a respective pixel 30 in a row connected to the vertical selection line 6, and accumulated charges in capacitor 3 of the pixel 30 flow through the TFT 4 to a signal line 5, to be read out at an external integration amplifier 7. After the read-out, an off-voltage is applied to the vertical selection line 6 and an on-voltage is applied to a subsequent vertical selection line 6 by a vertical shift register 8, and a signal is read out from a respective pixel 30 in a subsequent row. Such operations are repeated to read out one picture.

In the conventional flat panel X-ray detector, circuits ale substantially constituted by laminating thin films, with small inter-layer distances so that conductor lines in different layers have relatively large wiring capacities developed therebetween, in particular at cross regions between signal lines 5 and vertical selection lines 6, causing a signal-to-noise (hereafter referred to "S/N") ratio of a read picture co be decreased.

Further, signals in a column of pixels are read substantially by a single signal line, taking a corresponding interval of time for signal read-out.

Further, when increasing pixel integrity, the difficulty of proportional scale-down of TFT makes hard the provision of a sufficient pixel capacity.

Further, from a spatial restriction due to one-side installation, it is difficult to effect a desirable change of pixel capacity in accordance with photographing conditions.

Further, a necessary lime interval for reading one picture constitutes a minimum unit time to which associated operations are bound and in which no different actions are allowed for a single flat panel detector. For example, within a unit time in which a first picture is taken and its signal is held, it is unable for the detector to answer a desire for a second picture.

SUMMARY OF THE INVENTION

The present invention has been made with such points in view, and has it for the object to provide a radiographic flat panel detector permitting a decreased wiring capacity allowing an improved S/N ratio, a shorter signal read-out time, a higher pixel integrity with a secured pixel capacity, charge accumulation capacities to be switched in accordance with photographic conditions, an image holding condition allowing a picture to be photographed, or a photography at a different angle to cope with accompanied disturbances.

To achieve the object, an aspect of the invention provides a radiographic flat panel detector comprising a substrate, a first circuit formed on one side of the substrate and a second circuit formed on a different side of the substrate, the first and second circuits including a plurality of photoelectric conversion devices, a plurality of capacitors and a plurality of switching devices, and an electric contact provided through the substrate for interconnection between the first and second circuits.

According to this aspect, two circuits that are electrically and optically separated from each other by a thickness of a substrate and electrically interconnected by an electric contact are formed in regions on both front and back sides of the substrate, so that the integration density per unit area of substrate surface can be increased, in addition to that the two circuits can be allotted either as part of a radiation detecting circuit to be electrically or optically separated and the other as the rest, or can be constituted as a pair of radiation detecting circuits to be electrically or optically separated from each other.

Another aspect of the invention provides a radiographic flat panel detector in which a plurality of capacitors for accumulating electric charges generated by a plurality of photoelectric conversion devices receiving radiated rays are arrayed together with a plurality of switching devices in a matrix on a substrate, wherein the radiographic flat panel detector has "a contact hole that makes electrical contact between front and back sides of the substrate by an electrically conductive substance buried in a minute through hole opened in the substrate" (hereafter sometimes simply referred to "electric contact hole" or "contact hole").

According to this aspect, by provision of a contact hole for electrical interconnection between front and back sides of a substrate, it is allowed for the front and back sides of the substrate to be each formed with a pixel made up of components such as a photoelectric conversion device, a capacitor and a switching device or part of pixel or associated components, as the components formed on the front and back sides of the substrate can be connected via the contact hole, to thereby constitute a flat panel detector making use of front and back sides of substrate, permitting an improved flexibility in component arrangement, when increasing pixel density.

For the provision of an electric contact between front and back sides of a substrate, one may employ the method of opening a minute hole through a photosensitive glass. The photosensitive glass comprises a silicate glass having metallic ions melted with an added sensitizing agent, which glass is photosensitive to ultraviolet rays, and has under heat processing a tendency to generate metallic colloids and crystallize, as they constitute cores. Resultant crystals are very fine and easily dissolves in acid, permitting a minute processing such as formation of a hole complicated in configuration. Such a minute hole may be stuffed with an electrically conductive substance to provide an electric contact between front and back sides of the glass.

Another aspect of the invention provides a radiographic flat panel detector in which a plurality of capacitors for accumulating electric charges generated by a plurality of photoelectric conversion devices receiving radiated rays are arrayed together with a plurality of switching devices in a matrix on a substrate, wherein the radiographic flat panel detector has contact holes that makes electrical contacts between front and back sides of the substrate by an electrically conductive substance buried in minute through holes opened in the substrate, numbers of capacitors for accumulating electric charges generated from a number of photoelectric conversion devices and numbers of switching devices are arranged in matrices on both of the front and back sides of the substrate, and the number of photoelectric conversion devices for receiving radiated rays to generate electric charges are provided simply on one side of the substrate, capacitors formed on the other side are adapted via the contact holes for accumulating electric charges generated from photoelectric conversion devices on the one side, and switching devices are provided on the both sides, respectively to independently switch for electric charges generated by the photoelectric conversion devices to be or not to be introduced to capacitors formed on the both sides.

According to this aspect, as photoelectric conversion devices are provided on a radiant ray reception side, switching devices are operable, e.g., for capacitors formed on a front side of a substrate to accumulate signals of a picture, and on or before read-out of signals from those capacitors, switching devices are operable for capacitors formed on a back side of the substrate to accumulate signals of another picture, thus permitting two pictures to be photographed without delay.

BRIEF DESCRIPTION OF THE ACCOMPANYING DRAWINGS

The above and further objects and novel features of the invention will more fully appear from the following detailed description when the same is read in conjunction with the accompanying drawings, in which:

FIG. 1B shows an essential part of the detector D1 including an electric contact 1a.

FIG. 2 is a stereoscopic circuit diagram of a flat panel detector according to another embodiment of the invention;

FIG. 9A is a stereoscopic circuit diagram of a flat panel detector according to another embodiment of the invention;

DETAILED DESCRIPTION OF THE PREFERRED EMBODIMENTS

Figure 1A:
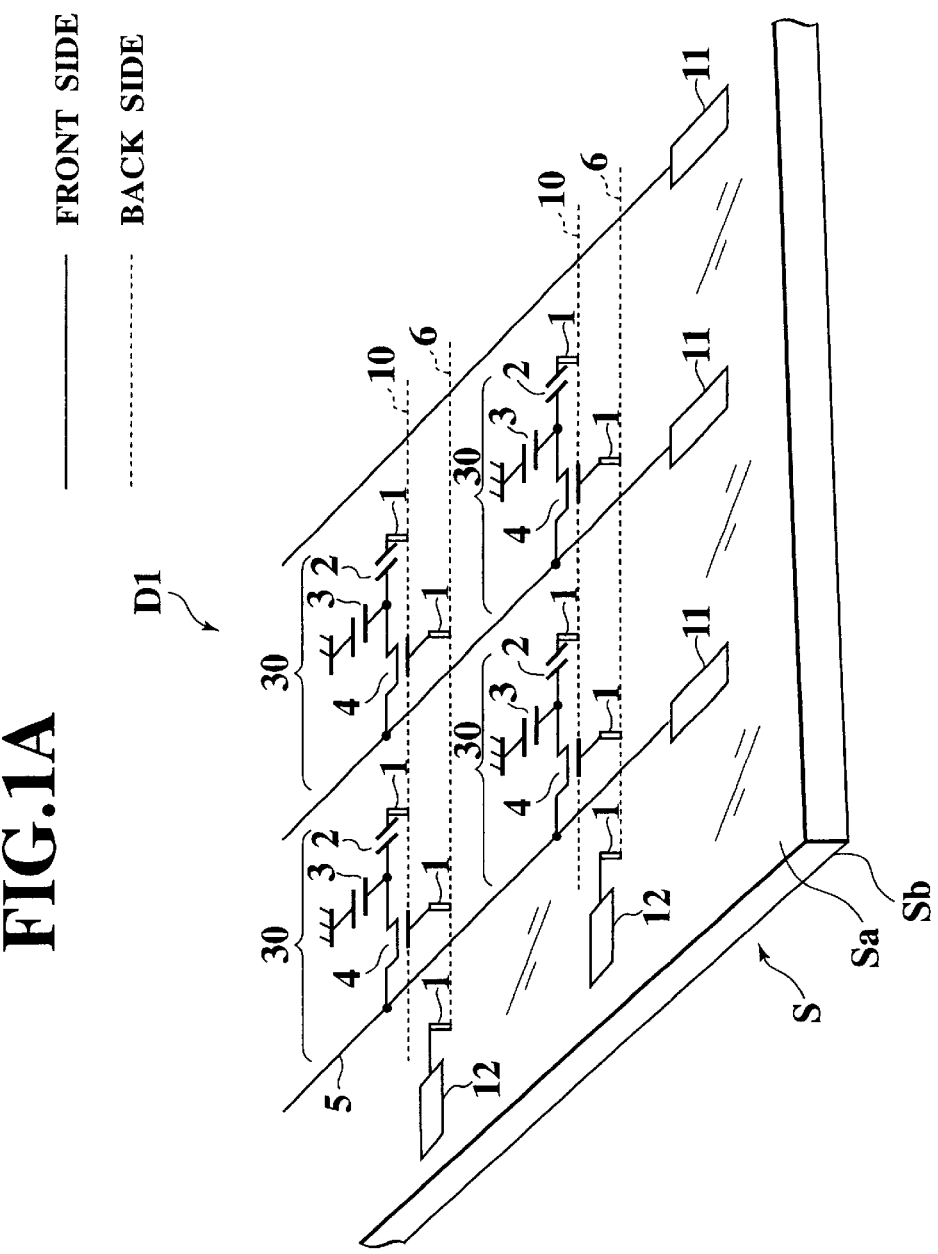
FIG. 1A is a stereoscopic circuit diagram of a flat panel detector according to an embodiment of the invention.

There will be detailed below the preferred embodiments of the present invention with reference to the accompanying drawings. Like members are designated by like reference characters.

Figure 1B:
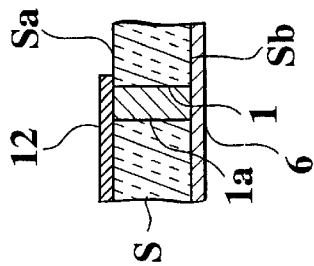

FIG. 1A shows a flat panel detector D1 according to a first embodiment of the invention, in which elements on a front side Sa of a glass substrate S are depicted by solid lines and those on a back side Sb are depicted by broken lines. FIG. 1B shows an essential part of the detector D1 including an electric contact 1a.

The flat panel detector D1 includes a plurality of pixels 30 arrayed like a lattice on the front side Sa of the glass substrate S. Each pixel 30 comprises a photoelectric conversion device 2 for generating a quantity of electric charges corresponding to an amount of incident light or a dose of incident X rays thereto, a capacitor 3 for accumulating generated charges, and a TFT 4 for signal read-out. Signal lines 5 for reading signals outside are provided on the same side (the front side Sa in this case) of the glass substrate S that serves as an array substrate for the pixels 30 to be formed thereon. Vertical selection lines 6 for selecting the pixels 30 are provided on an opposite side of the glass substrate (the back side Sb in this case) to the side Sa of the signal lines 5. Each TFT 4 for signal read-out has a gate terminal provided on the front side Sa and connected to a corresponding vertical selection line 6 via an associated electric contact hole 1 that has an electric contact 1a extending therethrough. Bias lines 10 cross the signal lines 5, on the opposite side (Sb) to these lines 5, and each bias line 10 is connected to corresponding pixels 30 via associated electric contact holes 1. Other lines may likewise cross signal lines 5, and may be likewise connected to pixels 30.

Pads 12 for the vertical selection lines 6 are located in an end region of the glass substrate S. on the same side (Sa) as pads 11 for the signal lines 5, and those pads 12 are each connected to a corresponding vertical selection line 6 via an electric contact hole 1 vicinal thereto. Pads 12 may be provided on the opposite side (Sb) to the signal lines 5.

The substrate S may be made of other material than glass: e.g. resin or plastic.

The photoelectric conversion device 2 may comprise a selenium device for direct conversion from X rays to electric charges, or other applicable device, e.g. a combination of a sensitized sheet and a photo-diode.

There will be described actions of the flat panel detector D1. X rays are irradiated from an X-ray tube (not shown), transmitted through an inspection object (not shown), and incident to the detector D1, where the photoelectric conversion device 2 in a respective pixel 30 receives X rays, and generates electric charges, as the device 2 is biased through a line 10. Generated charges are accumulated in the capacitor 3, as the TFT 4 is off.

In due course, an on-voltage is applied to a certain vertical selection line 6 from a corresponding pad 12, and imposed on TFT's of a corresponding row to pixels 30 via associated contact holes 1, turning these TFT's on, whereby accumulated charges in associated capacitors 3 are discharged via the TFT's to corresponding signal lines 5, so that corresponding signals are read at corresponding pads 11. Read signals are shifted, and processed at a signal processor (not shown) to provide a video signal, which is displayed as an image on a monitor (not shown).

According to this embodiment, the signal lines 5 and the vertical selection lines 6 and bias lines 10 crossing them are provided on opposite sides Sa, Sb of the glass substrate S, so that at a respective line cross region a pair of crossing lines 5, 6 or 5, 10 are spaced apart from each other.

To this point, if the crossing lines 5, 6 or 5,10 were provided on the same side Sa of the glass substrate S, a respective line cross region should have had a significant wiring capacitance, besides an unexpected wiring capacitance along respective related line regions. Any wiring capacitance has a tendency to accumulate charges as a noise component that acts independently of signals from the capacitors 3. Such noise components would have been all collected at a capacitor portion of an integrating amplifier, increasing an associated noise component, resulting in a reduced S/N ratio.

In this embodiment, however, at each line cross point, the crossing lines 5, 6 or 5, 10 are formed on opposite sides Sa, Sb of the glass substrate S, thereby achieving an effective reduction of wiring capacitance in an associated region. As independent noise components from such regions are effectively reduced, a collected noise component should be significantly reduced, resulting in an improved S/N ratio.

The flat panel detector D1 may employ a radiophotographic system of a pixel charge transfer type, a pixel signal amplification type, or any applicable type else, for effective signal reading.

It should be noted in the following embodiments that elements on a front side of a substrate are depicted by solid lines and those on a back side of the substrate are depicted by broken lines, without showing the substrate.

FIG. 2 shows a flat panel detector D2 according to a second embodiment of the invention.

The flat panel detector D2 also includes a plurality of pixels 30 arrayed like a lattice on a front side of a glass substrate, Each pixel 30 comprises a photoelectric conversion device 2 for generating a quantity of electric charges corresponding to an amount of incident light or a dose of incident X rays thereto, a capacitor 3 for accumulating generated charges, and a TFT 4 for signal read-out.

Pairs of vertical selection lines 61, 62 for selecting pairs of neighboring rows of pixels 30 are formed on the same side (the front side) of the glass substrate as the pixels 30. Pairs of signal lines 51, 52 for reading signals outside are provided on an opposite side (a back side) of the glass substrate, and connected to source terminals of the TFT's 4 in related rows of pixels 30 via associated electric contact holes 1 provided through the substrate.

In the flat panel detector D2, paired signal lines 51, 52 are provided for a respective column of pixels 30. As two signal lines 51, 52 are provided for each column of pixels 30, these pixels 30 are grouped into even-numbered ones to be connected to one signal line 51 and odd-numbered ones to be connected to the other signal line 52. The pixels 30 may be grouped by two or more regions they belong, to be connected to either signal line 51 or 52. Three or more signal lines may be provided for a respective column of pixels, and these pixels may be adequately grouped for their separate connection to any signal line.

To read signals from each pixel column provided with a pair of signal lines 51, 52, an on-voltage is simultaneously applied to a pair of vertical selection lines 61, 62 for selecting a pair of neighboring pixel rows, and pixels 30 at corresponding rows in the pixel column have their signals read as a unit-pixel signal through the two signal lines 51, 52. in other words, there are simultaneously read signals of two pixels 30 of the pixel column. In the case of a pixel column provided with a greater number of signal lines than two, an on-voltage may be simultaneously applied to an identical number of vertical selection lines to thereby simultaneously read signals from a corresponding number of pixels 30.

According to this embodiment, pair of signal lines 51, 52 are provided on an opposite side of a substrate relative to signal lines 61, 62, permitting a simultaneous reading of signal charges from a plurality of pixels 30, allowing an enhanced signal reading rate.

Figure 3:
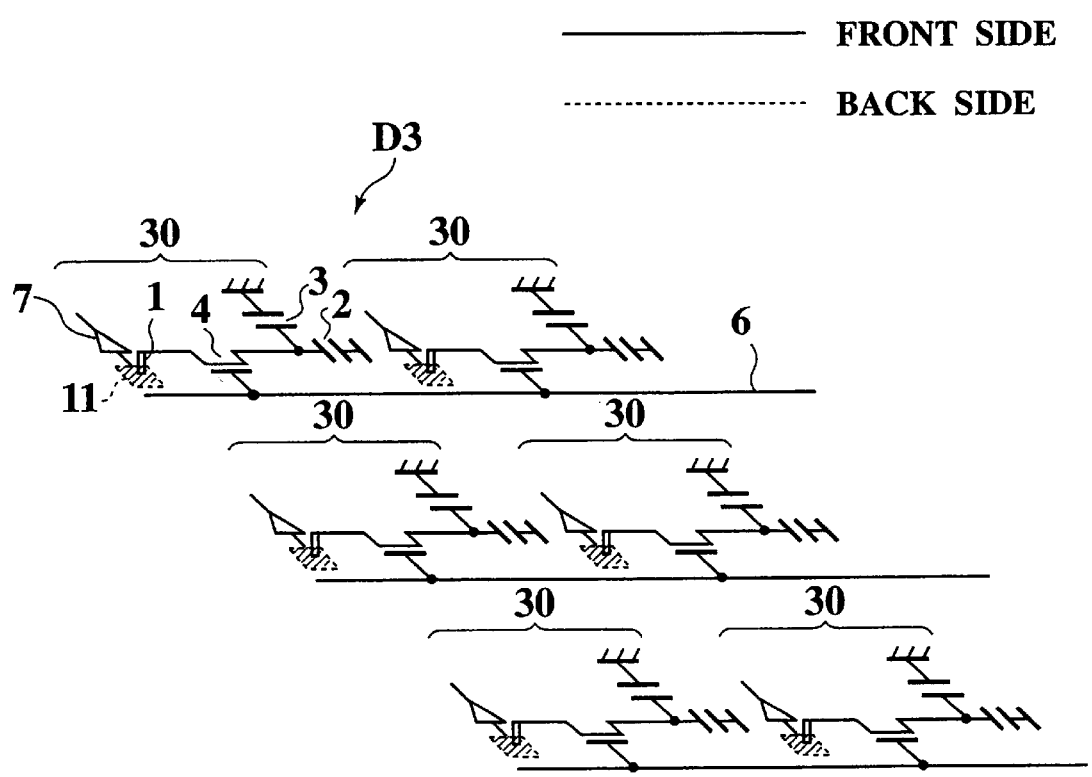
FIG. 3 is a stereoscopic circuit diagram of a flat panel detector according to another embodiment of the invention.

FIG. 3 shows a flat panel detector D2 according to a third embodiment of the invention.

The flat panel detector D3 also includes a plurality of pixels 30 allayed like a lattice on a front side of a glass substrate. Each pixel 30 comprises a photoelectric conversion device 2 for generating a quantity of electric charges corresponding to an amount of incident light or a dose of incident X rays thereto, a capacitor 3 for accumulating generated charges, and a TFT 4 for signal read-out.

Vertical selection lines 6 for selecting pixels 30 are formed on the same side (the front side) of the glass substrate as the pixels 30. Each pixel 30 has a signal pad 11 for reading a signal therefrom at an opposite side (a back side) of the substrate, which pad 11 is connected to a source terminal of the TFT 4 of the pixel 30 via an electric contact hole 1 provided through the substrate. The glass substrate is mounted on a PC (printed-circuit) board (not shown) of a multi-layered ordinary structure. The PC board is provided with circuitry on its front side, which circuitry has a signal pad (not shown) at a corresponding location to a respective pad 11 of the glass substrate, and an integration amplifier 7 connected to the signal pad, so that one amplifier 7 is provided on the PC board for a respective pixel 30 on the glass substrate.

In this embodiment, to read signals, an on-voltage is simultaneously applied to all vertical selection lines 6, so that accumulated charges in all pixels 30 can be simultaneously read through associated pads 11 and integration amplifiers 7, with a remarkably increased signal reading Tate.

Figure 4:
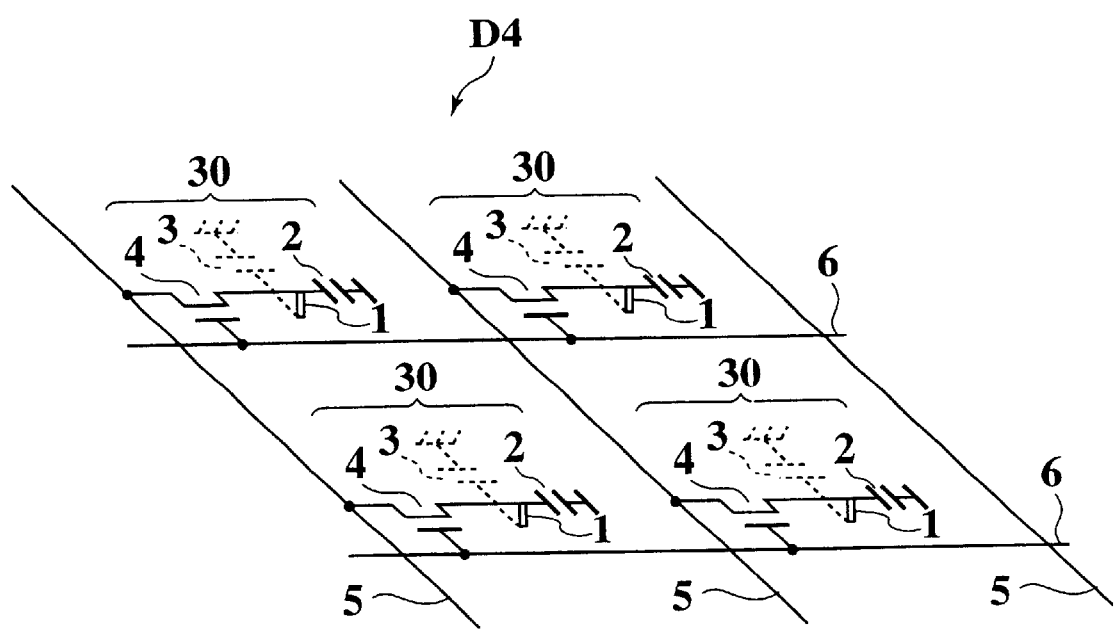
FIG. 4 is a stereoscopic circuit diagram of a flat panel detector according to another embodiment of the invention.

FIG. 4 shows a flat panel detector D4 according to a fourth embodiment of the invention.

The flat panel detector D4 includes a plurality of pixels 30 arrayed like a lattice on a front side of a glass substrate. Each pixel 30 comprises a photoelectric conversion device 2 for generating a quantity of electric charges corresponding to an amount of incident light or a dose of incident X rays thereto, and a TFT 4 for signal read-out.

Vertical selection lines 6 for selecting pixels 30 and signal lines 5 for reading signals are formed on the same side (the front side) of the glass substrate as the pixels 30. Each pixel 30 has a capacitor 3 for accumulating generated charges, which capacitor 3 is formed on an opposite side (a back side) of the substrate, and connected to the photoelectric conversion device 2 via an electric contact hole 1 provided through the substrate.

According to this embodiment, when scaling down the size of pixels 30 with a different scaling factor for the TFT's 4 not to be so reduced in size, there can be secured with ease a place for provision of such capacitors 3 that have a matching capacitance to the size of TFT's 4, as the capacitors 3 are formed on the back side of the glass substrate that is different from the front side on which the pixels 30 are formed together with their TFT's 4, with a significant contribution to the pixel integrity to be higher.

Figure 5:
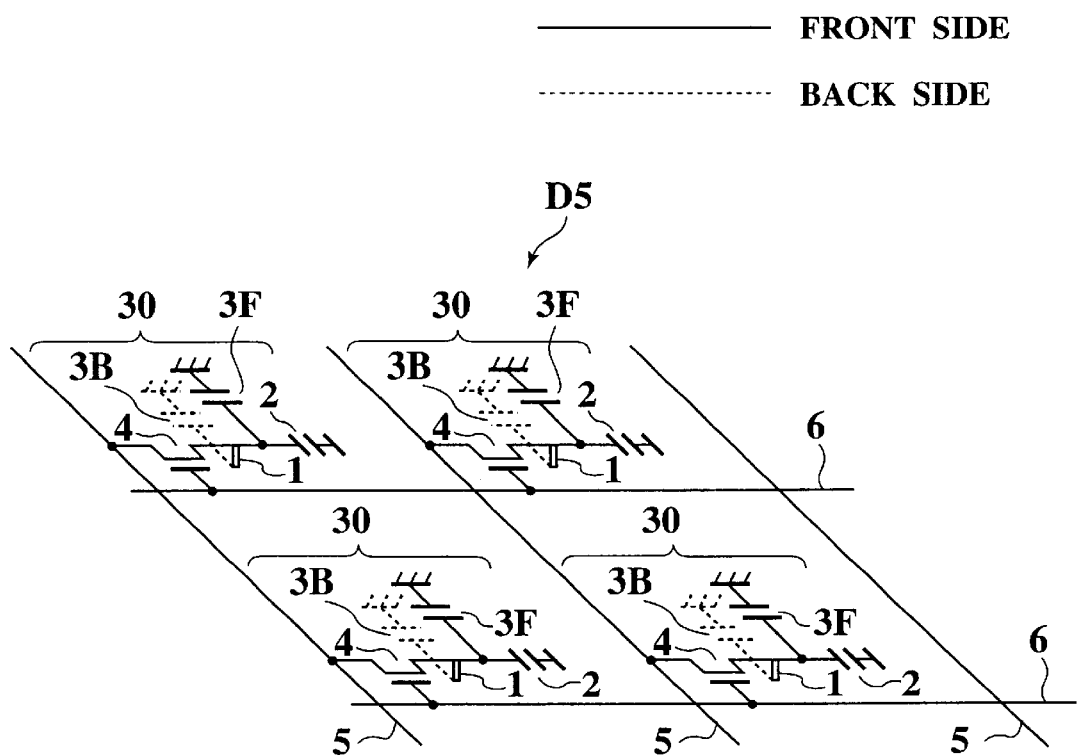
FIG. 5 is a stereoscopic circuit diagram of a flat panel detector according to another embodiment of the invention.

FIG. 5 shows a flat panel detector D5 according to a fifth embodiment of the invention.

The flat panel detector D5 includes a plurality of pixels 30 arrayed like a lattice on a front side of a glass substrate. Each pixel 30 comprises a photoelectric conversion device 2 for generating a quantity of electric charges corresponding to an amount of incident light or a dose of incident X rays thereto, and a TFT 4 for signal read-out.

Vertical selection lines 6 for selecting pixels 30 and signal lines 5 for reading signals are formed on the same side (the front side) of the glass substrate as the pixels 30. Each pixel 30 has a pair of capacitors 3F, 3B for accumulating generated charges, one capacitor 3F being formed on the above-noted same side, and the other capacitor 3B being formed on an opposite side (a back side) thereto and connected to the photoelectric conversion device 2 via an electric contact hole 1 provided through the substrate.

According to this embodiment, as one capacitor 3B is formed on a different side from the side on which the other capacitor 3F is formed, two capacitors 3F, 3B can be provided without increasing pixel size, facilitating the provision of a necessary capacitance to be secured in free from pixel size.

Figure 6:
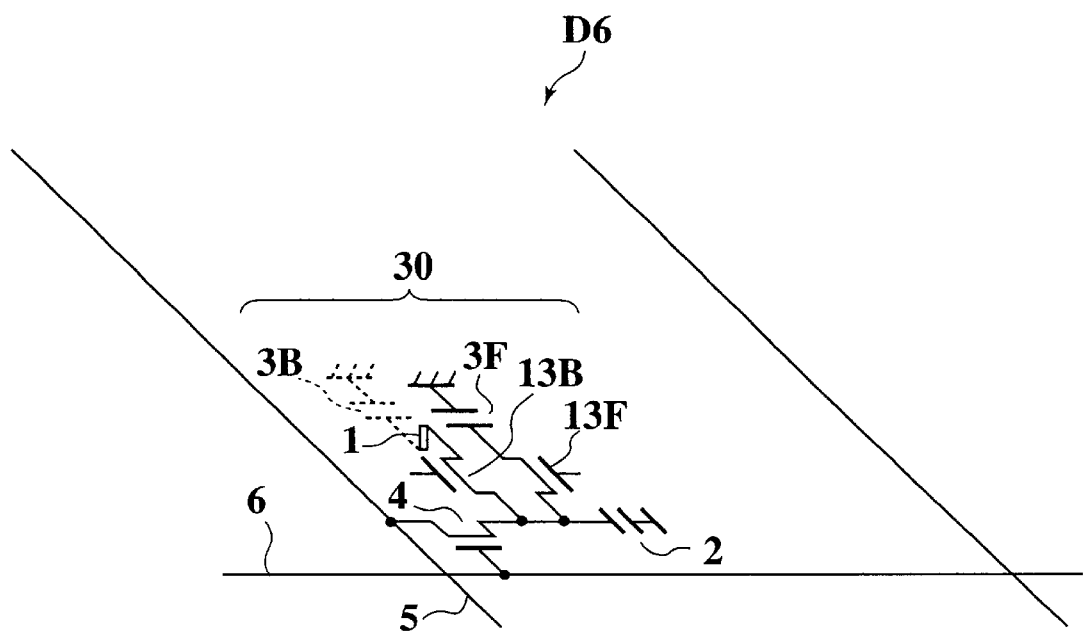
FIG. 6 is a stereoscopic circuit diagram of a flat panel detector according to another embodiment of the invention.

FIG. 6 shows a flat panel detector D6 according to a sixth embodiment of the invention.

The flat panel detector D6 includes a plurality of pixels 30 arrayed like a lattice on a front side of a glass substrate. Each pixel 30 comprises a photoelectric conversion device 2 for generating a quantity of electric charges corresponding to an amount of incident light or a dose of incident X rays thereto, and a TFT 4 for signal read-out.

Vertical selection lines 6 for selecting pixels 30 and signal lines 5 for reading signals are formed on the same side (the front side) of the glass substrate as the pixels 30. Each pixel 30 has a pair of capacitors 3F, 3B for accumulating generated charges, one capacitor 3F being formed on the front side and connected to the photoelectric conversion device 2 via a switching device 13F formed on the same side, and the other capacitor 3B being formed on an opposite side (a back side) thereto and connected to the photoelectric conversion device 2 via an electric contact hole 1 provided through the substrate and another switching device 13B formed on the front side.

According to this embodiment, a conventional reading operation is applicable with the switching devices 13F, 13B either on and the other off. The capacitor 3B on the back side may be larger for photography use, and that 3F on the front side may be smaller for radioscopy use, to have a secured dynamic range or an improved S/N ratio.

The capacitors 3F, 3B may be either smaller to be formed on the same side as other pixel components such as TFT 4, and the other larger to be formed on a different side from the side on which such pixel components are formed. Such side selection for provision of large and small capacitors allows an efficient layout of pixel components.

The capacitors 3F, 3B on the front and back sides may be identical so that one can: store charges of a current signal in either capacitor 3F and turn off an associated switching device 13F to keep the charges from being read soon; turn on the other switching device 13B and take a subsequent picture, storing charges of this signal in the other capacitor 3B; and separately read charges stored in the capacitors 3F, 3B. Data of tow pictures can thus be temporarily stored in the glass substrate, permitting a pair of pictures to be continuously taken within a short lime, allowing a stereoscopic photography or the like to be efficiently taken in a short period.

Figure 7:
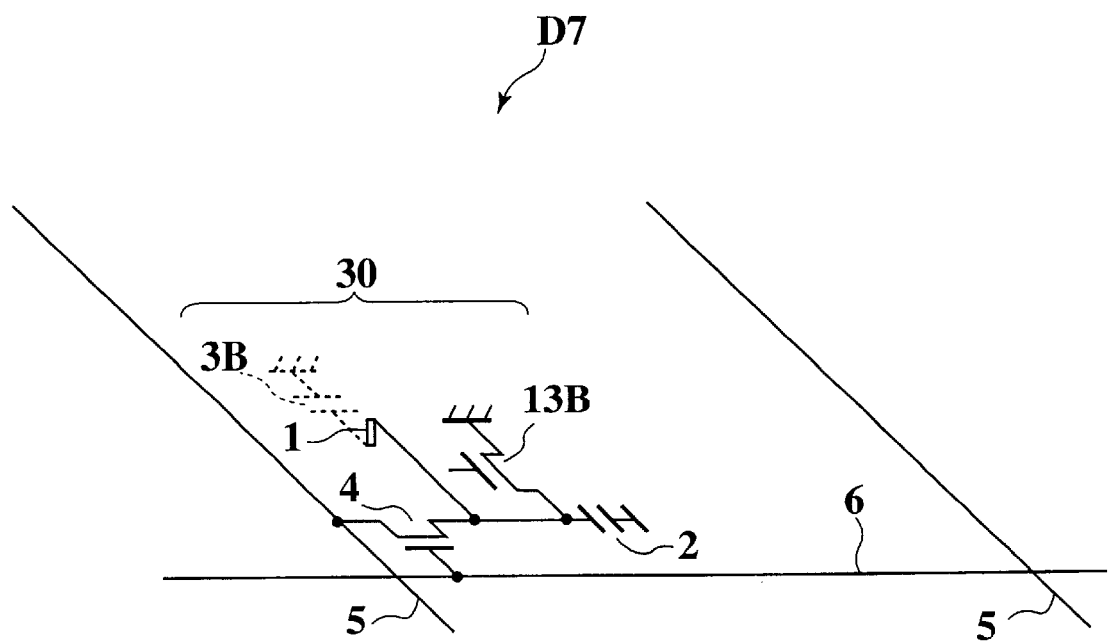
FIG. 7 is a stereoscopic circuit diagram of a flat panel detector according to another embodiment of the invention.

FIG. 7 shows a flat panel detector D7 according to a seventh embodiment of the invention.

The flat panel detector D7 includes a plurality of pixels 30 arrayed like a lattice on a front side of a glass substrate. Each pixel 30 comprises a photoelectric conversion device 2 for generating a quantity of electric charges corresponding to an amount of incident light or a dose of incident X rays thereto, and a TFT 4 for signal read-out.

Vertical selection lines 6 for selecting pixels 30 and signal lines 5 for reading signals are formed on the same side (the front side) of the glass substrate as the pixels 30. Each pixel 30 has a capacitor 3B formed on an opposite side (a back side) for accumulating generated charges, and connected to the photoelectric conversion device 2 via an electric contact hole 1 provided through the substrate. The photoelectric conversion device 2 is grounded via a switching device 13B formed on the same side (the front side) of the substrate.

In application of a flat panel detector to a biplane type X-ray diagnostic apparatus, when X-rays are radiated for a current step of photographic or radioscopic operation at one photographic system, part of radiated X-rays are scattered by objects in an irradiated region, such as a target of inspection, and scattered rays go incident to a flat panel detector in the other photographic system, where corresponding charges are generated and accumulated. As this photographic system is operated in a subsequent step, a quantity of electric charges accumulated till then is read from a respective pixel, including disturbances due to scattered rays in the previous step.

In the embodiment, however, probable disturbances due to extra rays such as scattered rays can be eliminated by turning on the switching device 13B so that an output terminal of the photoelectric conversion device 2 is directly grounded at a waiting side of a biplane detection system, where neither radioscopic nor photographic operations are performed. In other words, in an X-ray diagnostic apparatus having a plurality of photographic system's adapted with flat panel detectors for alternating radioscopic or photographic operations, probable disturbances can be eliminated by grounding a charge accumulating portion in a respective system out of duty for detection.

It should be noted that this grounding measure is not limited to a flat panel detector that has circuits formed on both sides of a glass substrate, and like measure is applicable also to a flat panel detector having a detection circuit formed simply on one side of a substrate.

According to this embodiment, therefore, against the likelihood that unnecessary scattered rays may enter as in the case of a biplane photography, the switching device 13B can be turned on, thereby directly grounding an output terminal of the photoelectric conversion device 2, whereby generated charges by scattered rays can be discharged to the ground and kept from being accumulated, so that intrusion of extra noise components to a current signal can be avoided, permitting interruptions such as by a resetting to be eliminated, allowing for associated operations such as in a biplane photography to be performed smooth.

Figure 8:
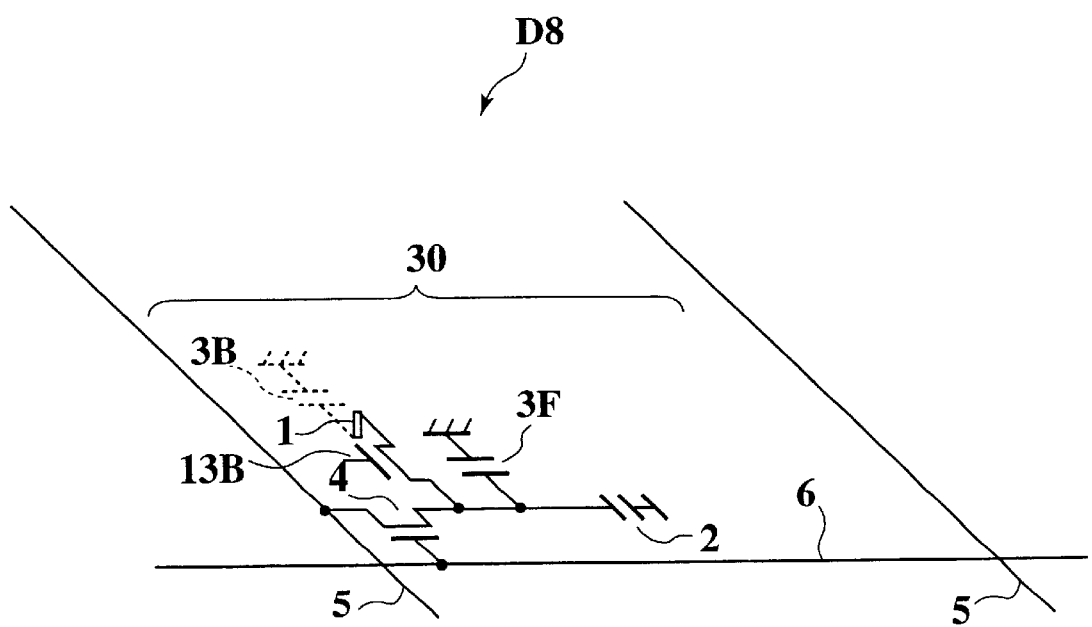
FIG. 8 is a stereoscopic circuit diagram of a flat panel detector according to another embodiment of the invention.

FIG. 8 shows a flat panel detector D8 according to an eighth embodiment of the invention.

The flat panel detector D8 includes a plurality of pixels 30 arrayed like a lattice on a front side of a glass substrate. Each pixel 30 comprises a photoelectric conversion device 2 for generating a quantity of electric charges corresponding to an amount of incident light or a dose of incident X rays thereto, a capacitor 3F for accumulating charges transmitted from the photoelectric conversion device 27 and a TFT 4 for signal read-out.

Vertical selection lines 6 for selecting pixels 30 and signal lines 5 for reading signals are formed on the same side (the front side) of the glass substrate as the pixels 30. Each pixel 30 has a capacitor 3B formed on an opposite side (a back side) for accumulating generated charges, and connected to the photoelectric conversion device 2 via an electric contact hole 1 provided through the substrate and a switching device 13B formed on the front side of the substrate.

When the photoelectric conversion device 2 receives weak light, such as when picking a mobile picture, for example, the switching device 13B is turned off so that the photoelectric conversion device 2 is connected simply to the capacitor 3F and has a relatively small total capacitance connected thereto for charge accumulation. Like this, upon reception of weak light, the capacitance for charge accumulation can be effectively decreased to thereby improve the S/N ratio. Further, a reduced accumulation capacitance allows a signal reading rate to be increased.

If the light to be received by the photoelectric conversion device 2 is strong, such as when picking a stationary picture, for example, then the switching device 13B is turned on so that the capacitors 3B and 3F are connected in parallel to the photoelectric conversion device 2. Therefore, upon reception of strong light, the capacitance for charge accumulation can be effectively increased to thereby improve the S/N ratio.

According to this embodiment, the magnitude of a capacitance for accumulation of output charges from the photoelectric conversion device 2 is adequately variable in dependence on the intensity of light to be received by the conversion device 2, thereby allowing a good S/N ratio to be always.

FIG. 9A shows a flat panel detector D9 according to a ninth embodiment of the invention.

The flat panel detector D9 comprises a front-side detector constituted with an array of pixels 30 formed on a front side of a glass substrate, and a back-side detector constituted with a corresponding array of pixels 30 formed on a back side of the substrate.

In the front-side detector, each pixel 30 comprises a switching device 13F for turning the pixel 30 on and off, a photoelectric conversion device 2 for generating a quantity of electric charges corresponding to an amount of incident light or a dose of incident X rays thereto, a capacitor 3F for accumulating charges generated at the photoelectric conversion device 2, and a TFT 4F for signal read-out. Signal lines 5F for reading signals outside and vertical selection lines 6F for selecting front-side pixels 30 are provided on the same side of the substrate (the front side in this case) as those pixel components. Each signal line 5F is connected to a corresponding pad 11F for signals to be read out therethrough from a respective associated pixel 30.

In the back-side detector, each pixel 30 comprises a switching device 13B for turning the pixel 30 on and off, a capacitor 3B for accumulating charges generated at the photoelectric conversion device 2 on the front side, and a TFT 43 for signal read-out. Signal lines 5B for reading signals outside and vertical selection lines 6B for selecting back-side pixels 30 are provided on the same side of the substrate (the back side in this case) as these pixel components. Each back-side pixel 30 employs the photoelectric conversion device 2 of a corresponding front-side pixel 30, as a common photoelectric conversion device, and has an electric connection route thereto composed of an electric contact hole 1 provided through the substrate. Each signal line 5B is connected to a corresponding pad 11B for signals to be read out therethrough from a respective associated pixel 30.

According to this embodiment, when a photograph is taken with one switch 13F on and the other switch 13B off, the signal charges of the photoelectric conversion device 2 are accumulated in the capacitor 3F on the front side. Thereafter, the switch 13F is turned off. As a result, it becomes possible to read out the signals of the image accumulated in the capacitor 3F. At the time, if the switch 13B is turned on to take another photograph, signal charges of the photoelectric conversion device 2 are accumulated in the capacity 3B via the contact hole 1.

The flat panel detector D9 does not need a blanking, and is suitable for a multiple picture picking system such as a stereoscopic photography, a biplane photography or a pulsatory photography.

Figure 9B:
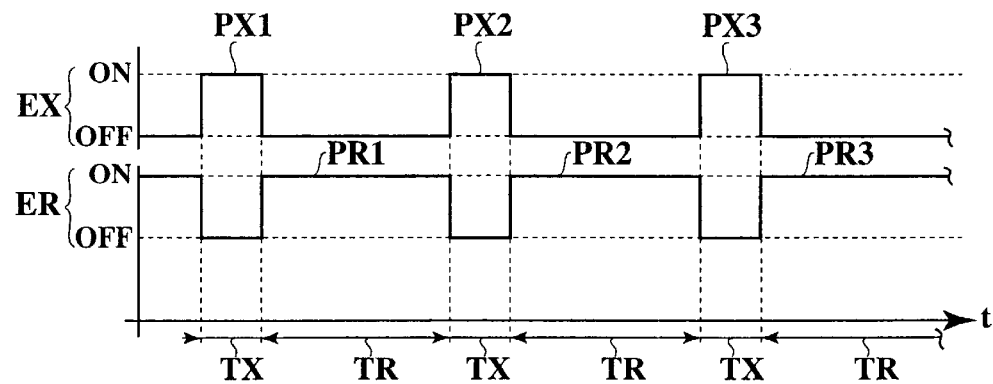
FIG. 9B is a time chart of signal read-out actions of a conventional detector.

FIG. 9B shows in time chart a series of signal read-out actions of a conventional detector employed in a stereographic system.

This detector employs a radiation command EX that comprises a sequence of short pulses PXi (i=1,2,3, . . . ) turning on by a period of TX+TR and turning off after a duration TX, and a read command ER that comprises a sequence of long pulses PRi (i=1,2,3, . . . ) turning on by a period of TR+TX and turning off after a duration TR.

Radiation starts with a short pulse PXi on for a current picture to be photographed for generation of electric charges to be accumulated as signals in capacitors, and ends with the short pulse PXi off, when a long pulse PRi turns on to start reading signals of the capacitors, and turns off to end.

The radiation needs a blanking (=TR), which is several times longer than the duration TX. The current picture by pulse PXi may be a left view for a stereograph of a target, and a subsequent picture by pulse $PX_{+1}$ may be a right view therefor. The target may have an inherent tendency to move, and the stereograph may be incorrect.

Figure 9C:
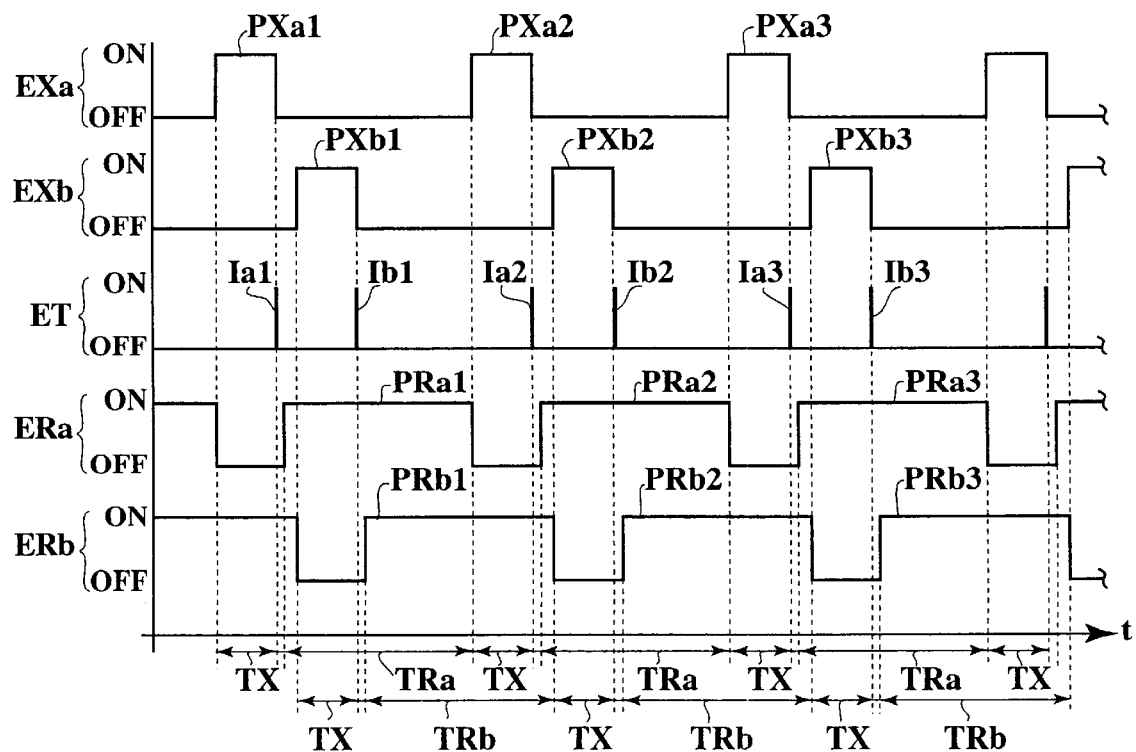
FIG. 9C is a time chart of signal read-out control actions of the flat panel detector of FIG. 9A.

FIG. 9C shows in time chart a series of signal read-out control actions of the flat panel detector D9, as it is employed in a stereographic system.

The flat panel detector D9 employs: a combination of a first radiation command EXa that comprises a sequence of first short pulses PXai (i=1,2,3, . . . ) turning on by a period of TX+(signal transfer control time)+TRa and turning off after a duration TX, and a second radiation command EXb that comprises a sequence of second short pulses PXbi (i=1,2,3, . . . ) turning on by a period of TX+(control time)+TRb and turning off after a duration TX; a signal transfer control command ET that comprises one of a sequence of first impulses Iai (i=1,2,3, . . . ) occurring by a period of (signal transfer control time)+Tra+TX, and a sequence of second impulses Ibi (i=1,2,3, . . . ) occurring by a period of (control time)+Trb+TX; and a combination of a first read command ERa that comprises a sequence of first long pulses PRai (i=1,2,3, . . . ) turning on by a period of TRa+TX+(signal transfer control time) and turning off after a duration Tra, and a second read command ERb that comprises a sequence of second long pulses PRbi (i=1,2,3, . . . ) turning on by a period of TRb+TX+(control time) and turning off after a duration Trb.

First radiation starts with a first short pulse PXai on for a first current picture to be photographed for generation of electric charges to be accumulated as first signals in front-side capacitors 3F, and ends with the first short pulse PXai off, when a first impulse Iai occurs to instantaneously transfer the first signals from the front-side capacitors 3F to back-side capacitors 3B, then a first long pulse PRai turns on to start reading first signals of the back-side capacitors 3B via the back-side electrode pad 11B, and turns off to end.

Just after a rise of the first long pulse PRai, second radiation starts with a second short pulse PXbi on for a second current picture to be photographed for generation of electric charges to be accumulated as second signals in the front-side capacitors 3F, and ends with the second short pulse PXbi off, then with a lapse of control time a second long pulse PRbi turns on to start reading second signals of the front-side capacitors 3F via the front-side electrode pads 11F, and turns off to end. The second impulses Ibi are employed for signal transfer in a case first signals are accumulated on the front side and second signals are accumulated on the back side.

The first current picture by pulse PXai may be a left view for a stereograph of a target, and the second current picture by pulse PXbi may be a right view therefor. Although the target may have an inherent tendency to move, the stereograph should be sufficiently correct, as the left and right views are both based on two current pictures.

After a left picture is photographed, its accumulated data are transferred to capacitors 3B on the back side, so that radiation rays can be promptly irradiated on the front side to take a right picture, thus providing an excellent effect for stereography.

The present embodiment can provide an excellent effect for a typical pulse radiography, as well. Supposing the accumulated charge transfer time from front side to back side to be small enough, if the reading command pulse has the same duration as the radiation command pulse, there is needed no blanking. If the reading command pulse has a double duration to the radiation command pulse, the radiation command can be a pulse sequence with an on-off duty ratio of 50%. Though depending on the duration of an associated reading command pulse as described, the radiation interval for pulse radiography can thus be reduced.

Figure 10:
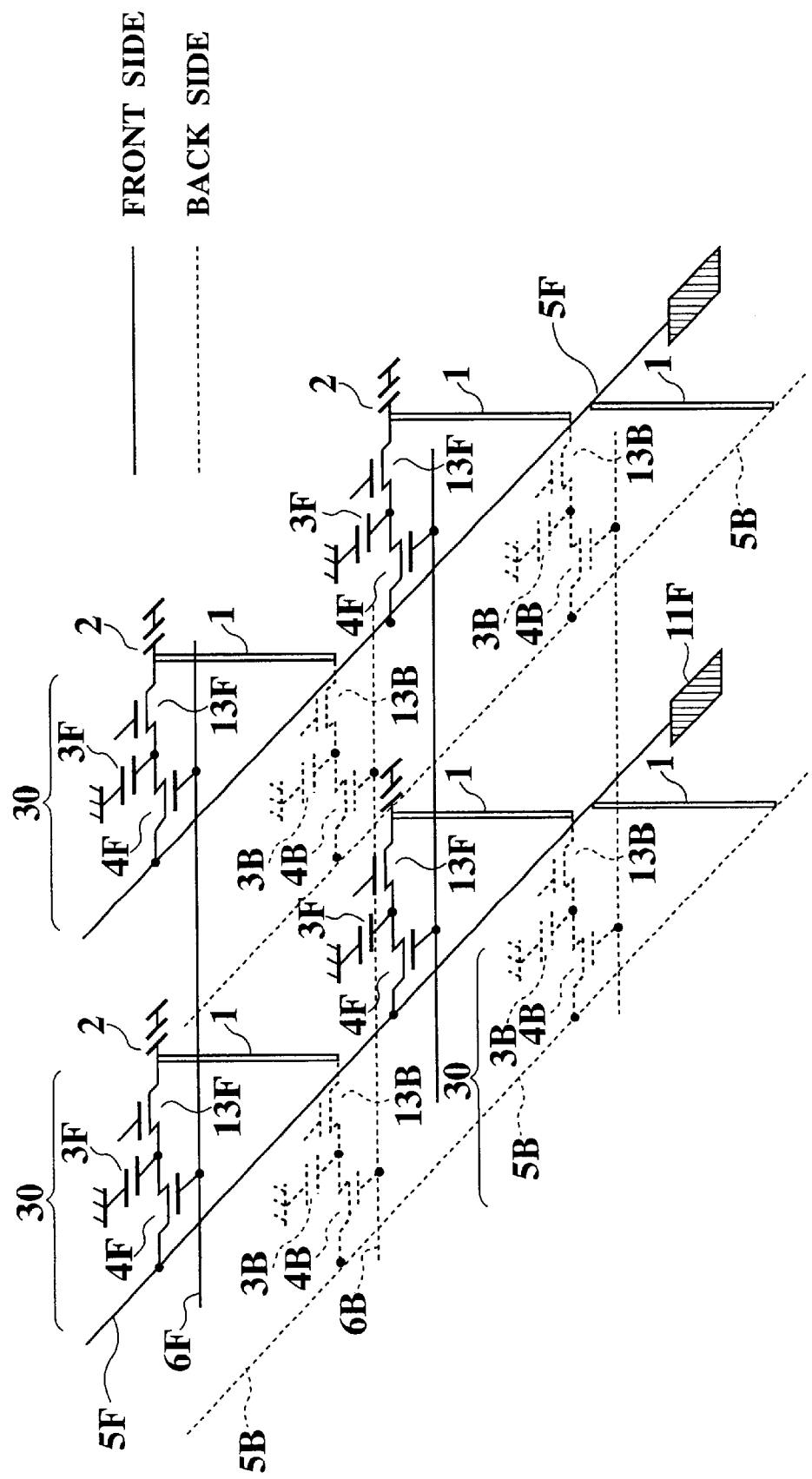
FIG. 10 is a stereoscopic circuit diagram of a flat panel detector according to another embodiment of the invention.
Figure 11:
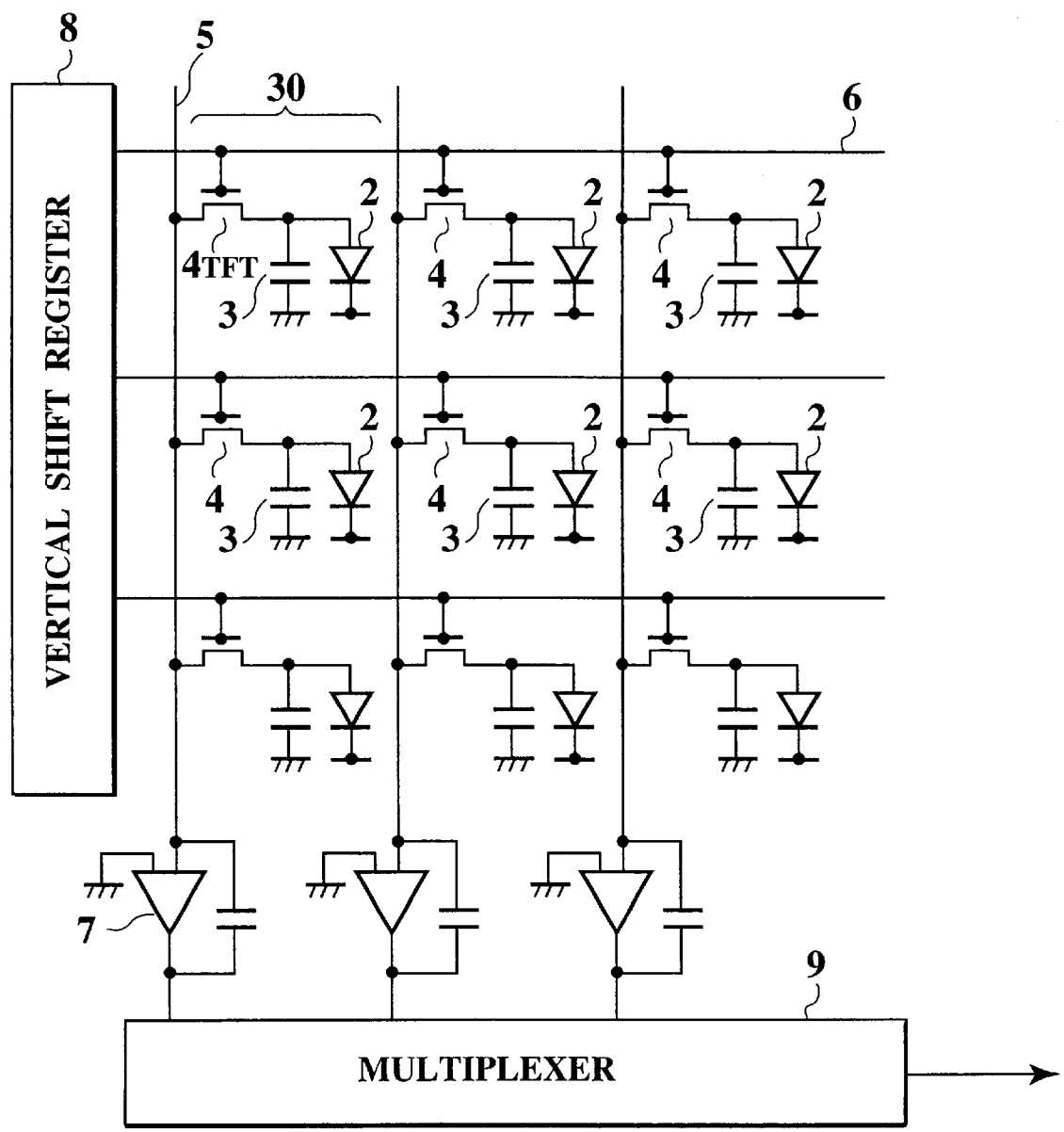
FIG. 11 is a circuit diagram of a conventional flat panel detector.

In application to a biplane photography, accumulated charges as signals at one of paired radiographic or photographic systems can be transferred to an opposite side of a substrate promptly after the photographing, the transferred signals are kept free from disturbances due to scattered rays of radiation at the other system, FIG. 10 shows a flat panel detector D10 according to a tenth embodiment of the invention The flat panel detector D10 has an identical arrangement to the embodiment of FIG. 9A, unless otherwise described below, and comprises a front-side detector constituted with an array of pixels 30 formed on a front side of a glass substrate, and a back-side detector constituted with a corresponding array of pixels 30 formed on a back side of the substrate.

In the flat panel detector D10, a respective signal line 5B of the back-side detector is connected via an associated electrical contact hole 1 to a corresponding frontside pad 11F, so that this pad 11F is shared by front-side and back-side signal lines 5F, 5B. Although signal read-out is alternately performed between front and back sides of the substrate, post-staged amplification circuitry is allowed to be constituted with a single system to be sufficient, with a reduced cost. It will be seen that the detector D10 has like effects to the detector D9.

As will be seen from the foregoing embodiments, in a species of the invention, a signal line for reading signals from capacitors via switch devices and an electrically conductive line extending in parallel to the signal line are provided on a side of a glass substrate, and another conductive line extending in a crossing direction to the signal line is provided on a side different from the side on which the signal line is provided.

According to this species, a signal line may be provided on a front side on which e.g. a photoelectric conversion device is formed, and a vertical selection line crossing the signal line may be provided on a back side that is a side different from the side on which the signal line is provided, so that the signal line and the vertical selection line can be spaced by a thickness of glass substrate at a crossing point therebetween, with a reduced wiring capacity.

In another species of the invention, a plurality of signal lines for reading signals from capacities via switch devices are provided on a side of a glass substrate different from a side thereof on which photoelectric conversion devices are formed, and those signal lines are electrically connected via contact holes to the capacitors.

According to this species, in a case e.g. photoelectric conversion devices are formed on a front side of a glass substrate, a plurality of signal lines may be provided on a back side of the substrate and connected via electric contact holes to the photoelectric conversion devices, so that the signal lines on the back side can be used to read charges accumulated as signals in capacitors on the front side. Accumulated charges can be simultaneously read through a plurality of signal lines, and signals of whole capacitors can be read at a high rate.

In another species of the invention, a plurality of electrode pads for external electrical connection of a glass substrate are provided on a side of the substrate different from a side thereof on which photoelectric conversion devices are formed, and are connected via contact holes to capacitors.

According to this species, for example, capacities formed on a front side of a glass substrate may be electrically connected via TFT's and contact holes to electrode pads formed on a back side of the substrate, to thereby concurrently read signals corresponding to accumulated charges from whole capacitors via a plurality of electrode pads to the outside, allowing a remarkably increased signal reading rate.

Another species of the invention provides a radiographic flat panel detector in which a plurality of capacitors for accumulating electric charges generated by a plurality of photoelectric conversion devices receiving radiated rays are arrayed together with a plurality of switching devices in a matrix on a substrate, wherein a capacitor for accumulating electric charges generated by a photoelectric conversion device is formed on a side different from a side on which the photoelectric conversion device is formed, and the capacitor and the photoelectric conversion device are interconnected through a contact hole.

Usually, when decreasing the size of pixels to increase the density, the size of their TFT's becomes unable to be more reduced, and capacitors for accumulating electric charges generated by photoelectric conversion devices become unable to be so reduced, either, giving rise to a difficulty of securing a space for arranging the capacitors. According to this species, however, capacitors can be formed on a side different from a side on which a photoelectric conversion device is formed, allowing for a space to be secured, permitting capacitors to have necessary and sufficient sizes secured, when reducing the size of pixels to increase the density.

In another species of the invention, a switching device is provided for switching a charge output end of a photoelectric conversion device to be grounded or not.

According to this species, in a biplane photography, at a flat panel detector on a side free of a photographing duty, its switching device or the like may be turned on to thereby ground a charge output end of a photoelectric conversion device, So that scattered rays or the like received by the photoelectric conversion device can escape to a grounded end, without accumulating noises, thus permitting a smooth biplane photography to be performed with a favorable image quality, without reset operations or the like.

Another species of the invention provides a radiographic flat panel detector in which a plurality of capacitors for accumulating electric charges generated by a plurality of photoelectric conversion devices receiving radiated rays are arrayed together with a plurality of switching devices in a matrix on a substrate, wherein at least one or more capacitors for accumulating electric charges generated by photoelectric conversion devices are formed on a side on which the photoelectric conversion devices are formed, and at least one or more capacitors for accumulating electric charges generated by the photoelectric conversion devices are formed on a side different from the side on which the photoelectric conversion devices are formed.

According to this species, for example, a photoelectric conversion device and a switching device may be formed on a front side, capacitors for accumulating electric charges generated from the photoelectric conversion device may be formed on the front side and a back side, and the capacitors formed on the both sides may be connected in parallel via a contact hole, to thereby substantially double the capacitance of an associated pixel without enlarging the size of the pixel on the front side, permitting an improved design flexibility.

Another species of the invention includes a first switching device for a switching to or not to introduce electric charges to a capacitor formed on the same side as a photoelectric conversion device, and a second switching device for a switching to or not to introduce electric charges to a capacitor formed on a side different from the side on which the photoelectric conversion device is formed.

According to this species, for a stereoscopic photography or the like, a first picture may be photographed with a first switching device on and a second switching device off, thereby accumulating electric charges then generated by reception of a photoelectric conversion device in a capacitor formed e.g. on a front side on which the photoelectric conversion device is formed, and a second picture may be photographed with the second switching device on and the first switching device off, thereby accumulating electric charges then generated by the photoelectric conversion device receiving light, in a capacitor formed on a back side, allowing a stereoscopic photography to be performed within a short time not including a signal reading time. Further, the capacitors formed on the front and back sides may be changed in capacitance to be selectively used by operations of the first and second switching devices in accordance with the type of photography.

Another species of the invention has simply one of the first and second switching devices.

According to this species, even with a single switching device, capacitors can be switched for accumulating electric charges generated by a photoelectric conversion device receiving light.

In another species of the invention, a signal line for reading signals from a capacitor formed on one side of a glass substrate is provided on the that side, a signal line for reading signals from a capacitor formed on the other side of the glass substrate is provided on this side, and the signal lines are connected to electrode pads provided on the same sides therewith and adapted for external electric connection of the glass substrate.

According to this species, read signals transmitted through a signal line provided on a front side of a glass substrate may be output through an electrode pad formed on that side, and signals transmitted through a signal line provided on a back side of the glass substrate may be output through an electrode pad formed on this side, so that signals can be independently read from capacitors formed on the front and back sides of the substrate via the electrode pads formed thereon.

In another species of the invention, a signal line for reading signals from a capacitor formed on one side of a glass substrate is provided on the that side, a signal line for reading signals from a capacitor formed on the other side of the glass substrate is provided on this side, an electrode pad to be connected to the signal line provided on the one side is provided on the same side, and the signal line provided on the other side is connected via a contact hole to the electrode pad.

According to this species, read signals transmitted through signal lines provided on both sides of a glass substrate may be output in order via an electrode pad formed on one side, to have a halved number of electrode pads.

As will be seen from the foregoing description, according to the invention, there is provided a radiographic flat panel detector that permits a decreased wiring capacity allowing an improved S/N ratio, a shorter signal read-out time, a sufficient charge accumulation capacity to be secured, charge accumulation capacities to be switched in accordance with photographic conditions, an image holding condition to hold a picture allowing another picture to be photographed, and a facilitated multi-directional photography free from disturbances due to a photography different of angle.

Therefore, the invention allows for an increased image collection rate, a wider dynamic range, a temporal image holding, and a facilitated stereoscopic or biplane photography.

Further, also for effective use of front and back sides of a single glass substrate, there is allowed a design flexibility to be advantageously increased.

While preferred embodiments of the invention have been described using specific terms, such description is for illustrative purposes, and it is to be understood that changes and variations may be made without departing from the spirit or scope of the following claims.

What is claimed is:

1. A radiographic flat panel detector comprising:
   a substrate;
   a first circuit formed on one side of the substrate and a second circuit formed on a different side of the substrate, the first and second circuits including a plurality of photoelectric conversion devices, a plurality of capacitors and a plurality of switching devices; and
   an electric contact provided through the substrate for interconnection between the first and second circuits,
   wherein the first circuit includes a photoelectric conversion device and a switching device, and
   the second circuit includes a capacitor connected via the electric contact to the photoelectric conversion device and the switching device.

2. The radiographic flat panel detector of claim 1, wherein
   the first and second circuits include a photoelectric conversion device, a capacitor connected to the photoelectric conversion device, and a switching device connected to the capacitor,
   the first circuit has a first electrically conductive line connected to the switching device, and the second circuit has a second electrically conductive line extending in a crossing direction to the first electrically conductive line.

3. The radiographic flat panel detector of claim 2, wherein the first electrically conductive line comprises a signal line for reading outside electric charges accumulated in the capacitor, and the second electrically conductive line comprises a vertical selection line for turning the switching device on and off.

4. The radiographic flat panel detector of claim 1, wherein the first circuit includes a photoelectric conversion device, a capacitor connected to the photoelectric conversion device, and a switching device connected to the capacitor, and the second circuit includes a signal line connected via the electric contact to the switching device.

5. The radiographic flat panel detector of claim 1, wherein the first circuit includes a photoelectric conversion device, and a set of capacitor and switching device connected to the photoelectric conversion device, and the second circuit includes an electrode pad adapted for external connection and connected via the electric contact to the set of capacitor and switching device.

6. The radiographic flat panel detector of claim 1, wherein the first and second circuits include a switching device connected to the photoelectric conversion device and a grounding terminal.

7. The radiographic flat panel detector of claim 1, wherein the first circuit includes a photoelectric conversion device, and a first capacitor connected to the photoelectric conversion device, and the second circuit includes a second capacitor connected via the electric contact to the photoelectric conversion device.

8. A radiographic flat panel detector comprising:

a substrate;

a first circuit formed on one side of the substrate and a second circuit formed on a different side of the substrate, the first and second circuits including a plurality of photoelectric conversion devices, a plurality of capacitors and a plurality of switching devices; and an electric contact provided through the substrate for interconnection between the first and second circuits, wherein the first circuit includes a photoelectric conversion device, and a first capacitor connected to the photoelectric conversion device, and the second circuit includes a second capacitor connected via the electric contact to the photoelectric conversion device, and wherein the first and second circuits include a first switching device connected between the photoelectric conversion device and the first capacitor, and a second switching device connected between the photoelectric conversion device and the second capacitor.

9. The radiographic flat panel detector of claim 8, wherein the first and second circuits include a switching device connected between the photoelectric conversion device and one of the first and second capacitors.

10. A radiographic flat panel detector comprising:

a substrate;

a first circuit formed on one side of the substrate and a second circuit formed on a different side of the substrate, the first and second circuits including a plurality of photoelectric conversion devices, a plurality of capacitors and a plurality of switching devices; and an electric contact provided through the substrate for interconnection between the first and second circuits, wherein the first circuit includes a photoelectric conversion device, a first switching device connected to the photoelectric conversion device, a first capacitor connected to the first switching device, and a second switching device connected to the first capacitor, and the second circuit includes a third switching device connected via the electric contact to the photoelectric conversion device, a second capacitor connected to the third switching device, and a fourth switching device connected to the second capacitor.

11. The radiographic flat panel detector of claim 10, wherein the first circuit further includes a first signal line connected to the second switching device, and a first electrode pad adapted for external connection and connected to the first signal line, and the second circuit further includes a second signal line connected to the fourth switching device, and a second electrode pad adapted for external connection and connected to the second signal line.

12. The radiographic flat panel detector of claim 10, wherein the first circuit further includes a first signal line connected to the second switching device, and an electrode pad adapted for external connection and connected to the first signal line, and the second circuit further includes a second signal line connected to the fourth switching device, the second signal line being connected to the electrode pad via another electric contact.

13. A radiographic flat panel detector in which a plurality of capacitors for accumulating electric charges generated by a plurality of photoelectric conversion devices receiving radiated rays are arrayed together with a plurality of switching devices in a matrix on a substrate, wherein the radiographic flat panel detector has a contact hole that makes electrical contact between front and back sides of the substrate by an electrically conductive substance buried in a minute through hole opened in the substrate.

14. The radiographic flat panel detector of claim 13, wherein first and second circuits formed on the front and back sides of the substrate are interconnected through the contact hole, and include a photoelectric conversion device, a capacitor connected to the photoelectric conversion device, and a switching device connected to the capacitor, the first circuit has a first electrically conductive line connected to the switching device, and the second circuit has a second electrically conductive line extending in a crossing direction to the first electrically conductive line.

15. The radiographic flat panel detector of claim 14, wherein the first electrically conductive line comprises a signal line for reading outside electric charges accumulated in the capacitor, and the second electrically conductive line comprises a vertical selection line for turning the switching device on and off.

16. A radiographic flat panel detector according to claim 13 in which a plurality of capacitors for accumulating electric charges generated by a plurality of photoelectric conversion devices receiving radiated rays are arrayed together with a plurality of switching devices in a matrix on a substrate, wherein a capacitor for accumulating electric charges generated by a photoelectric conversion device is formed on a side different from a side on which the photoelectric conversion device is formed, and the capacitor and the photoelectric conversion device are interconnected through the contact hole.

17. A radiographic flat panel detector according to claim 13 in which a plurality of capacitors for accumulating electric charges generated by a plurality of photoelectric conversion devices receiving radiated rays are arrayed together with a plurality of switching devices in a matrix on a substrate, wherein at least one or more capacitors for accumulating electric charges generated by photoelectric conversion devices are formed on a side on which the photoelectric conversion devices are formed, and at least one or more capacitors for accumulating electric charges generated by the photoelectric conversion devices are formed on a side different from the side on which the photoelectric conversion devices are formed.

18. A radiographic flat panel detector in which a plurality of capacitors for accumulating electric charges generated by a plurality of photoelectric conversion devices receiving radiated rays are arrayed together with a plurality of switching devices in a matrix on a substrate, wherein the radiographic flat panel detector has contact holes that makes electrical contacts between front and back sides of the substrate by an electrically conductive substance buried in minute through holes opened in the substrate, numbers of capacitors for accumulating electric charges generated from a number of photoelectric conversion devices and numbers of switching devices are arranged in matrices on both of the front and back sides of the substrate, and the number of photoelectric conversion devices for receiving radiated rays to generate electric charges are provided simply on one side of the substrate, capacitors formed on the other side are adapted via the contact holes for accumulating electric charges generated from photoelectric conversion devices on the one side, and switching devices are provided on the both sides, respectively to independently switch for electric charges generated by the photoelectric conversion devices to be or not to be introduced to capacitors formed on the both sides.

19. An X-ray diagnostic apparatus having radiographic flat panel detectors for a plurality of photographing systems to alternately serve for a photographic or radiographic duty, wherein a radiographic flat panel detector has a charge accumulation portion thereof grounded, as the charge accumulation portion is off the duty.

* * * * *